(12) United States Patent
Kang et al.

(10) Patent No.: US 11,600,441 B2
(45) Date of Patent: Mar. 7, 2023

(54) MULTILAYER ELECTRONIC COMPONENT

(71) Applicant: SAMSUNG ELECTRO-MECHANICS CO., LTD., Suwon-si (KR)

(72) Inventors: Seung Min Kang, Suwon-si (KR); Ho Sam Choi, Suwon-si (KR); Jong Ho Lee, Suwon-si (KR); So Hyeon Hong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/222,550

(22) Filed: Apr. 5, 2021

(65) Prior Publication Data
US 2022/0139622 A1 May 5, 2022

(30) Foreign Application Priority Data

Oct. 30, 2020 (KR) .................. 10-2020-0143502

(51) Int. Cl.
| | |
|---|---|
| *H01G 4/12* | (2006.01) |
| *H01G 4/008* | (2006.01) |
| *H01G 4/012* | (2006.01) |
| *H01G 4/30* | (2006.01) |

(52) U.S. Cl.
CPC ........... *H01G 4/1209* (2013.01); *H01G 4/008* (2013.01); *H01G 4/012* (2013.01); *H01G 4/30* (2013.01)

(58) Field of Classification Search
CPC ........ H01G 4/1209; H01G 4/30; H01G 4/012; H01G 4/008

USPC ..... 361/303, 321.1, 301.4, 311, 321.2, 321.6
See application file for complete search history.

(56) References Cited

U.S. PATENT DOCUMENTS

| 9,123,472 B2* | 9/2015 | Kim ..................... H01G 4/12 |
| 9,251,959 B2* | 2/2016 | Kim ..................... H01G 4/30 |
| 9,576,727 B2* | 2/2017 | Yamada ............... H01G 4/30 |
| 9,978,522 B2* | 5/2018 | Ahn .................... H01G 2/065 |
| 2007/0251066 A1* | 11/2007 | Kim ..................... H01G 4/012 |
| | | 29/25.02 |
| 2011/0096464 A1* | 4/2011 | Togashi .............. H01G 4/228 |
| | | 361/306.3 |

(Continued)

FOREIGN PATENT DOCUMENTS

| KR | 10-2014-0078935 A | 6/2014 |
| KR | 10-2019-0121139 A | 10/2019 |

*Primary Examiner* — Arun Ramaswamy
(74) *Attorney, Agent, or Firm* — Morgan, Lewis & Bockius LLP

(57) ABSTRACT

A multilayer electronic component includes a body including dielectric layers and internal electrodes. The internal electrodes are exposed to fifth and sixth surfaces of the body, and first ends thereof are respectively exposed to third or fourth surfaces of the body. First and second side margin portions are respectively disposed on the fifth and sixth surfaces. The body includes an active portion, and upper and lower cover portions disposed respectively on a first surface and a second surface of the active portion in a first direction. The ratio of a dimension of the lower cover portion in the first direction C to a dimension of the first side margin portion in the third direction A, $C/A \geq 2.6$, $C/T$ is 0.080, where T is a dimension of the body in the first direction, and $D < C$ where D is the dimension of the body in the first direction.

16 Claims, 12 Drawing Sheets

(56) References Cited

U.S. PATENT DOCUMENTS

| | | | |
|---|---|---|---|
| 2012/0300361 A1* | 11/2012 | Togashi | H01G 4/12 |
| | | | 156/89.12 |
| 2013/0319741 A1* | 12/2013 | Ahn | H05K 1/0271 |
| | | | 361/728 |
| 2014/0020942 A1* | 1/2014 | Cho | H05K 1/181 |
| | | | 361/301.4 |
| 2014/0166351 A1 | 6/2014 | Lee et al. | |
| 2016/0049247 A1* | 2/2016 | Kitano | H01G 4/232 |
| | | | 361/301.4 |
| 2018/0174757 A1* | 6/2018 | Kim | H01G 4/248 |
| 2020/0051739 A1 | 2/2020 | Park et al. | |

\* cited by examiner

MULTILAYER ELECTRONIC COMPONENT

CROSS-REFERENCE TO RELATED APPLICATION

This application claims the benefit of priority to Korean Patent Application No. 10-2020-0143502 filed on Oct. 30, 2020, with the Korean Intellectual Property Office, the disclosure of which is incorporated herein by reference.

TECHNICAL FIELD

The present disclosure relates to a multilayer electronic component.

BACKGROUND

A multilayer ceramic capacitor (MLCC), a type of multilayer electronic components, is a chip-type condenser, mounted on the printed circuit boards of various types of electronic products, including image display devices, such as a liquid crystal display (LCD) and a plasma display panel (PDP), a computer, a smartphone, a mobile phone, and the like, serving to charge or discharge electricity.

Such a multilayer ceramic capacitor may be used as a component of various electronic devices due to advantages of a miniaturized size, and high capacity as well as ease of mountability. As electronic devices such as computers and mobile devices are miniaturized and implemented with high output, demand for miniaturization and implementation of high capacitance in a multilayer ceramic capacitor are increasing.

In addition, in recent years, as industry interest in electronic products has increased, multilayer ceramic capacitors have been required to have high reliability and high strength characteristics to be used in automobiles and infotainment systems.

For miniaturization and high capacitance of a multilayer ceramic capacitor, it is required to maximize an effective area of an electrode (to increase an effective volume fraction required for implementing capacitance).

In order to implement miniaturization and high capacitance of the multilayer ceramic capacitor, as described above, in manufacturing the multilayer ceramic capacitor, by allowing an internal electrode to be exposed in a width direction of the body, a method, in which an area of the internal electrode in the width direction is maximized through a margin-free design, and a side margin portion is formed separately on the exposed surface of the electrode in a width direction of a chip in an operation before sintering after the chip is manufactured, is being applied.

Capacitance per unit volume of the capacitor may be improved by separately forming the side margin portion, but there has been a problem in that moisture resistance reliability may be deteriorated due to a decrease in the thickness of the side margin portion and moisture penetration into a junction portion of the side margin portion.

SUMMARY

An aspect of the present disclosure is to provide a multilayer electronic component having excellent moisture resistance reliability.

An aspect of the present disclosure is to provide a multilayer electronic component having improved accelerated lifespan characteristics.

An aspect of the present disclosure is to provide a miniaturized multilayer electronic component.

However, various and advantageous advantages and effects of the present disclosure are not limited to the above description, and will be more readily understood in the course of describing specific embodiments of the present disclosure.

According to an embodiment, a multilayer electronic component includes: a body including a plurality of dielectric layers, and including first and second surfaces opposing in a first direction, third and fourth surfaces connected to the first and second surfaces and opposing in a second direction, and fifth and sixth surfaces connected to the first to fourth surfaces and opposing in a third direction; a plurality of internal electrodes disposed inside the body, and exposed to the fifth and sixth surfaces, one ends of the plurality of internal electrodes respectively being exposed to the third or fourth surfaces; a first side margin portion disposed on the fifth surface; a second side margin portion disposed on the sixth surface; and an external electrode disposed on the third and fourth surfaces, wherein the body includes an active portion in which the dielectric layer and the internal electrode are alternately disposed in the first direction to form capacitance, an upper cover portion disposed on one surface of the active portion in the first direction, and a lower cover portion disposed on the other surface of the active portion in the first direction, wherein when a length of the first side margin portion in the third direction is A, and a length of the active portion in the first direction is B, a length of the lower cover portion in the first direction C, a length of the upper cover portion in the first direction D, and a length of the body in the first direction is T, D<C is satisfied, C/A is 2.60 or more, and C/T is 0.080 or more

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
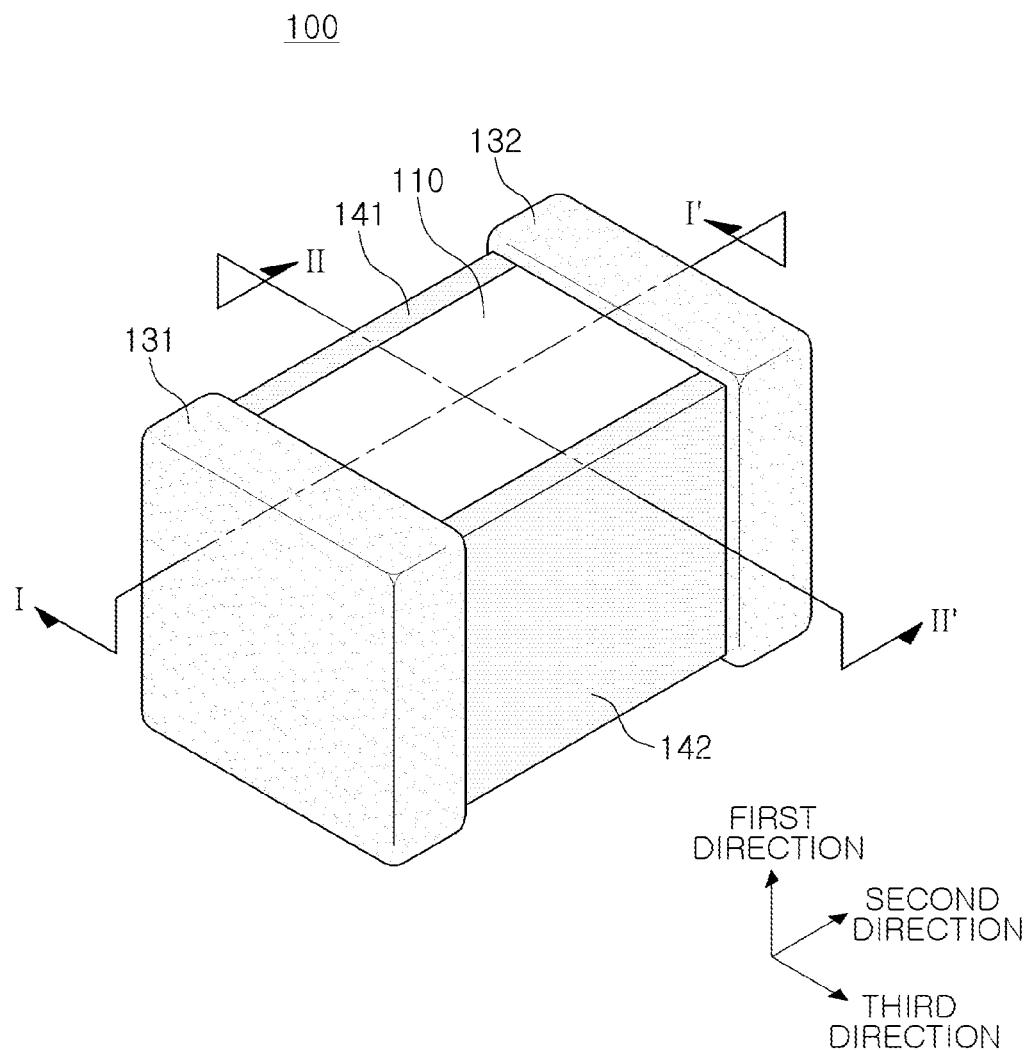
FIG. 1 is a perspective diagram schematically illustrating a multilayer electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be through and complete, and will fully convey the scope of the disclosure to those skilled in the art. Accordingly, shapes and sizes of elements in the drawings may be exaggerated for clarity of description, and elements indicated by the same reference numeral are same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the drawings, a first direction may be defined as a thickness direction, a second direction may be defined as a length direction, and a third direction may be defined as a width direction.

Multilayer Electronic Component

FIG. 1 is a perspective diagram schematically illustrating a multilayer electronic component according to an embodiment of the present disclosure.

Figure 2:
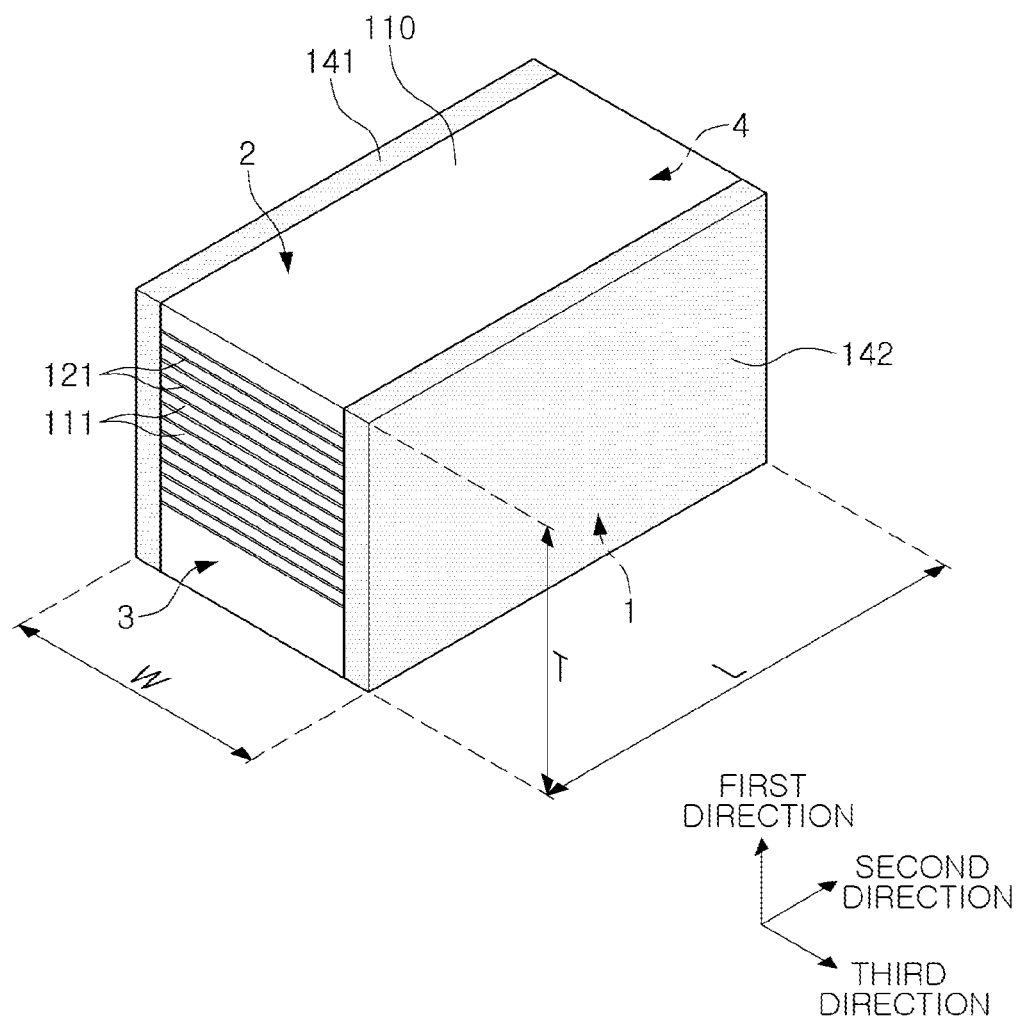
FIG. 2 is a perspective diagram illustrating the multilayer electronic component of FIG. 1 excluding external electrodes.

FIG. 2 is a perspective diagram illustrating the multilayer electronic component of FIG. 1 excluding external electrodes.

Figure 3:
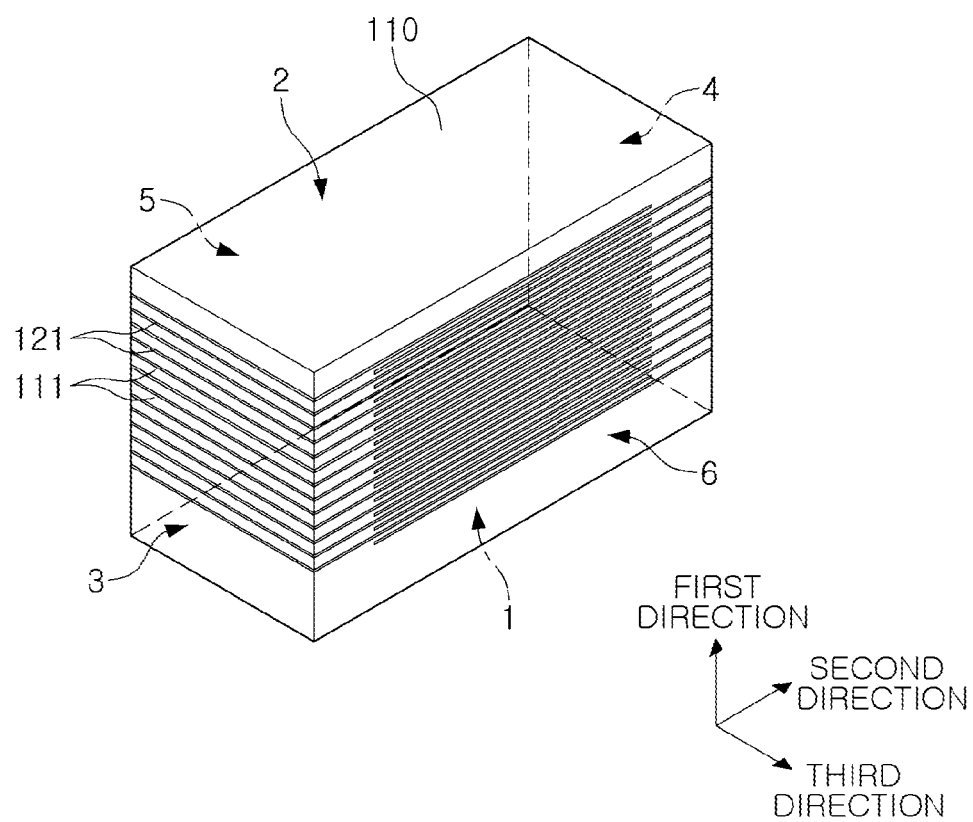
FIG. 3 is a perspective diagram illustrating the multilayer electronic component of FIG. 1 excluding external electrodes and side margin portions.

FIG. 3 is a perspective diagram illustrating the multilayer electronic component of FIG. 1 excluding external electrodes and side margin portions.

Figure 4:
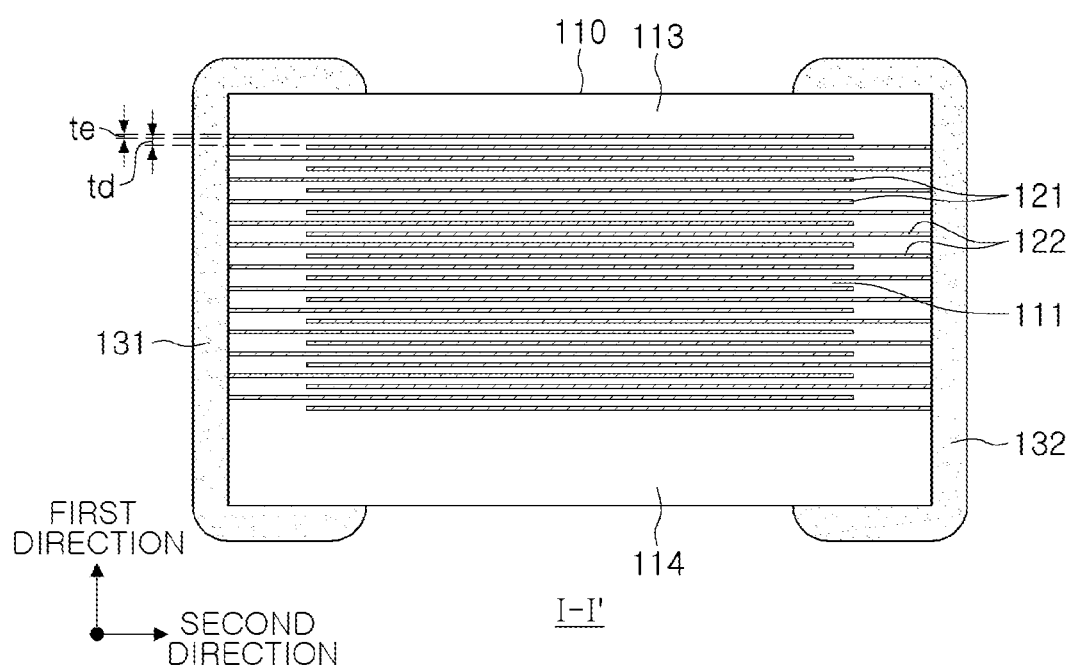
FIG. 4 is a cross-sectional diagram taken along line II' of FIG. 1.

FIG. 4 is a cross-sectional diagram taken along line II' of FIG. 1.

Figure 5:
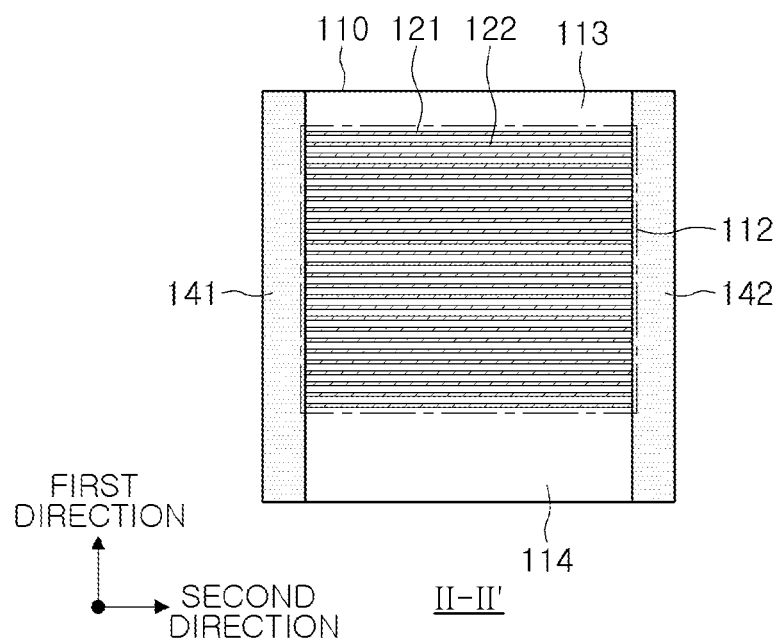
FIG. 5 is a cross-sectional diagram taken along line II-II' of FIG. 1.

FIG. 5 is a cross-sectional diagram taken along line II-II' of FIG. 1.

Figure 6:
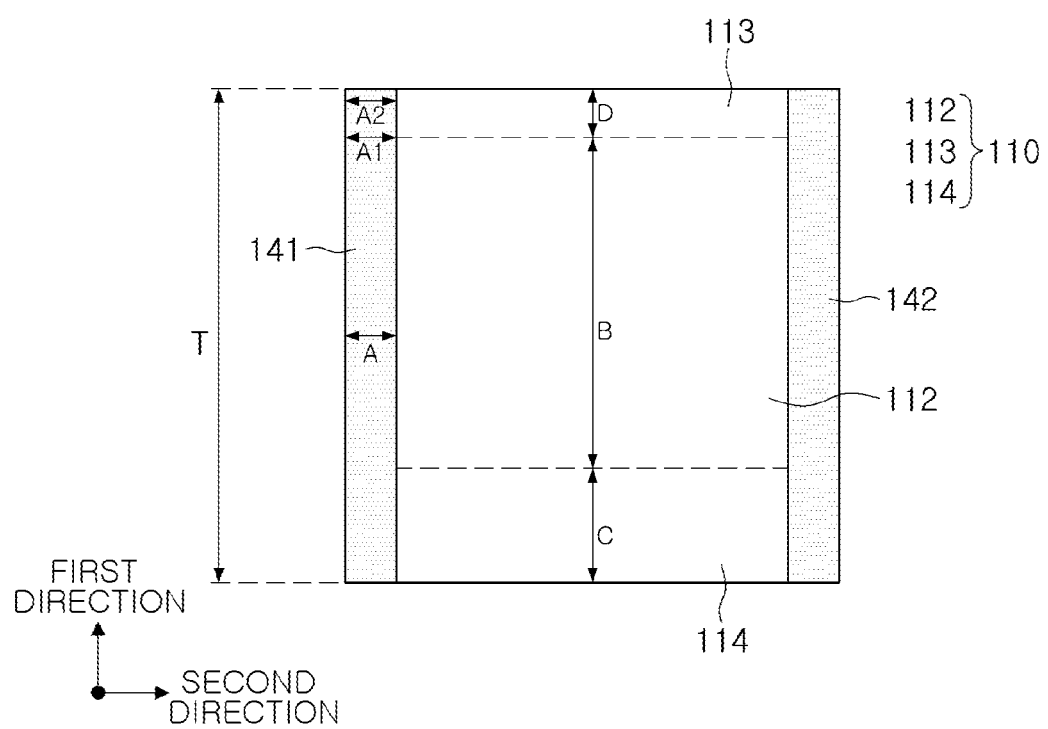
FIG. 6 is a schematic cross-sectional diagram schematically illustrating the embodiment of FIG. 5 to illustrate a dimensional relationship between components included in the multilayer electronic component.

FIG. 6 is a schematic cross-sectional diagram schematically illustrating the embodiment of FIG. 5 to illustrate a dimensional relationship between components included in the multilayer electronic component.

Hereinafter, a multilayer electronic component 100 according to an embodiment of the present disclosure will be described in detail, referring to FIGS. 1 to 6.

According to an embodiment of the present disclosure, a multilayer electronic component 100 includes: a body 110 including a plurality of dielectric layers 111, and including first and second surfaces 1 and 2 opposing in a first direction, third and fourth surfaces 3 and 4 connected to the first and second surfaces and opposing in a second direction, and fifth and sixth surfaces 5 and 6 connected to the first to fourth surfaces and opposing in a third direction; a plurality of internal electrodes 121 and 122 disposed inside the body, and exposed to the fifth and sixth surfaces, one ends of the plurality of internal electrodes respectively being exposed to the third or fourth surfaces; a first side margin portion 141 disposed on the fifth surface; a second side margin portion 142 disposed on the sixth surface; and external electrodes 131 and 132 disposed on the third and fourth surfaces, wherein the body includes an active portion 112 in which the dielectric layer and the internal electrode are alternately disposed in the first direction to form capacitance, an upper cover portion 113 disposed on one surface of the active portion in the first direction, and a lower cover portion 114 disposed on the other surface of the active portion in the first direction, wherein when a length of the first side margin portion in the third direction is A, and a length of the active portion in the first direction is B, a length of the lower cover portion in the first direction is C, a length of the upper cover portion in the first direction is D, and a length of the body in the first direction is T, D<C is satisfied, C/A is 2.60 or more, and C/T is 0.080 or more.

The body 110 is formed by alternately stacking a dielectric layer 111 and internal electrodes 121 and 122.

The specific shape of the body 110 is not particularly limited, but as illustrated, the body 110 may have a hexahedral shape, or a shape similar thereto. Due to shrinkage of ceramic powder particles included in the body 110 during a sintering process, the body 110 may have a substantially hexahedral shape, but may not have a hexahedral shape having completely straight lines.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4 and opposing each other in a third direction. In this case, it is not necessary to specifically limit a mounting surface, and for example, the first surface 1 or the second surface 2 may be the mounting surface.

The plurality of dielectric layers 111 forming the body 110 are in a sintered state, and a boundary between adjacent dielectric layers 111 may be integrated, such that it may be difficult to confirm without using a scanning electron microscope (SEM).

According to an embodiment of the present disclosure, a raw material for forming the dielectric layer 111 is not particularly limited, as long as sufficient electrostatic capacitance may be obtained therewith. For example, the raw material for forming the dielectric layer 111 may be a barium titanate ($BaTiO_3$)-based material, a lead composite perovskite-based material, a strontium titanate ($SrTiO_3$)-based material, or the like. The barium titanate-based material may include $BaTiO_3$-based ceramic powder, and the ceramic powder may be, for example, $BaTiO_3$, $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, in which calcium (Ca), zirconium (Zr), or the like, are partially dissolved in $BaTiO_3$, and the like.

In addition, various ceramic additives, organic solvents, plasticizers, binders, dispersants, and the like, may be added according to the purpose of the present disclosure.

A plurality of internal electrodes 121 and 122 disposed inside the body 110 are exposed to the fifth and sixth surfaces 5 and 6 of the body, but one end thereof is exposed to the third surface 3 or the fourth surface 4 of the body.

The internal electrodes 121 and 122 may include a first internal electrode 121 and a second internal electrode 122 having different polarities as a pair.

One end of the first internal electrode 121 may be exposed to the third surface 3, and one end of the second internal electrode 122 may be exposed to the fourth surface 4. The other end of the first internal electrode 121 may be disposed to be spaced apart from the fourth surface 4, and the other end of the second internal electrode 122 may be disposed to be spaced apart from the third surface 3.

External electrodes 131 and 132 may be disposed on the third and fourth surfaces 3 and 4 of the body to be connected to the internal electrodes 121 and 122.

Referring to FIG. 3, a first internal electrode 121 is formed on a dielectric layer 111. The first internal electrode 121 is not entirely formed in a length direction of the dielectric layer. That is, one end of the first internal electrode 121 may be formed up to the third surface 3 to be exposed to the third surface 3, and the other end of the first internal electrode 121 may be disposed at a predetermined distance from the fourth surface 4 of the body 110.

An end portion of the first internal electrode 121 exposed to the third surface 3 of the body 110 may be connected to the first external electrode 131.

Contrary to the first internal electrode 121, one end of the second internal electrode 122 may be exposed to the fourth surface 4 to be connected to the second external electrode 132, and the other end of the second internal electrode 122 is may be disposed at a predetermined distance from the third surface 3.

400 or more layers of the internal electrodes 121 and 122 may be stacked to implement a high-capacity multilayer electronic component, but an embodiment thereof is not limited thereto.

A material for forming the internal electrodes 121 and 122 is not particularly limited, and a material having excellent electrical conductivity may be used. For example, the internal electrodes 121 and 122 may be formed by printing a conductive paste for internal electrodes including one or more of nickel (Ni) and copper (Cu), palladium (Pd), silver (Ag), gold (Au), platinum (Pt), tin (Sn), tungsten (W), titanium (Ti), and alloys thereof on a ceramic green sheet.

As a printing method of the conductive paste for the internal electrodes, a screen-printing method, a gravure printing method, or the like, may be used, but the present disclosure is not limited thereto.

The body 110 may include an active portion 112 in which a dielectric layer 111 and the internal electrodes 121 and 122 are alternately disposed in a first direction to form capacitance, and an upper cover portion 113 disposed on one surface of the active portion in a first direction, and a lower cover portion 114 disposed on the other surface of the active portion in the first direction.

The active portion 112 is a portion serving to contribute to capacitance formation of the capacitor, and may be formed by repeatedly laminating a plurality of first and second internal electrodes 121 and 122 in the first direction (thickness direction) with a dielectric layer 111 interposed therebetween.

The upper and lower cover portions 112 and the 113 may be formed by laminating a single dielectric layer or two or more dielectric layers on both end surfaces of the active portion 112 in the first direction (the thickness direction), respectively, and may serve to basically prevent damage to the internal electrodes due to physical or chemical stress.

The upper and lower cover portions 113 and 114 may include the same material as the dielectric layer 111.

In addition, the lower cover portion 114 may have a thickness, greater than the upper cover portion 113 by increasing the number of stacked dielectric layers to be more than that of the upper cover portion 113.

Side margin portions 141 and 142 may be disposed on the fifth and sixth surfaces 5 and 6 of the body. The side margin portions 141 and 142 may include a first side margin portion 141 disposed on the fifth surface 5 and a second side margin portion 142 disposed on the sixth surface 6.

Each side portion of the plurality of internal electrodes 121 and 122 may be exposed to the fifth surface 5 and the sixth surface 6, which are surfaces of the body 110 in the third direction (width direction), and the first side margin portion 141 and the second side margin portion 142 may be disposed on the exposed side portion.

The side margin portions 141 and 142 may basically serve to prevent damage to the internal electrodes 121 and 122 due to physical or chemical stress.

According to an embodiment of the present disclosure, when a length of the first side margin portion 141 in the third direction is A, a length of the active portion 112 in the first direction is B, a length of the lower cover portion 114 in the first direction is C, a length of the upper cover portion 113 in the first direction is D, and a length of the body 110 in the first direction is T, D<C may be satisfied, C/A may be 2.60 or more, and C/T may be 0.080 or more. In this case, the length in the first direction may refer to 'a thickness', the length in the second direction may refer to 'a length', and the length in the third direction may refer to 'a width'.

In order to achieve miniaturization and high capacitance of the multilayer ceramic capacitor, which is a multilayer electronic component, in manufacturing the multilayer ceramic capacitor, the internal electrode is exposed in the width direction of the body, by allowing the internal electrode to be exposed in the width direction of the body, a method in which an area of the internal electrode in the width direction is maximized through a margin-free design, but a side margin portion is separately attached to the exposed surface of the electrode in the width direction of the chip in an operation before sintering after the chip is manufactured may be applied.

Although the capacitance per unit volume of the capacitor can be improved by the method of attaching the side margin portion separately, there has been a problem in that moisture resistance reliability may be deteriorated due to a decrease in the thickness of the side margin portion and moisture penetration into the junction portion of the side margin portion. The smaller the chip size is, the greater this problem becomes. In particular, when the chip size is 0603 or less (a length of 0.6 mm and a width of 0.3 mm), moisture resistance reliability may be significantly deteriorated.

In the present disclosure, in order to improve moisture resistance reliability while satisfying both the required chip size and capacitance, a thickness C of the lower cover portion may be made to be thicker than a thickness D of the upper cover portion, and a correlation between the thickness C of the lower cover portion, a width A of the side margin portion and a thickness T of the body may be controlled to improve moisture resistance reliability.

The thickness C of the lower cover part is thicker than the thickness D of the upper cover portion. That is, D<C is satisfied. The thickness C of the lower cover portion is 2.60 or more, compared to the width A of the side margin portion. That is, C/A is 2.60 or more. The thickness C of the lower cover portion, compared to the thickness T of the body is 0.080 or more. That is, C/T is 0.080 or more. As the above three conditions are satisfied, it is possible to improve moisture resistance reliability while minimizing a decrease in capacitance per unit volume as the lower cover portion is thickened. In addition, it is possible to suppress a decrease in moisture resistance reliability IR (insulation resistance) and occurrence of scattering.

In this case, the A, B, C and D may be measured in cross-sectional diagrams cut in the first and third directions from a center of the multilayer electronic component in the second direction. In addition, A may be measured from the center of the first direction of the cross-sectional diagram, and B, C, and D may be measured from the center of the third direction.

In this case, the thickness C of the lower cover portion may be 30 µm or more. Accordingly, by increasing density of the lower cover portion 114, a moisture resistance reduction time can be delayed as much as possible, thereby improving moisture resistance reliability.

In addition, an upper limit for C/A is not particularly limited, but, for example, C/A may be 3.20 or less. That is, C/A may be 2.60 or more and 3.20 or less. When C/A exceeds 3.20, there is a concern that the capacitance per unit volume may decrease.

In addition, an upper limit for C/T is not particularly limited, but, for example, the C/T may be 0.100 or less. That is, C/T may be 0.080 or more and 0.100 or less. When C/T exceeds 0.100, there is a concern that capacitance per unit volume may decrease.

Meanwhile, C/D may be 1.5 or more. When C/D is less than 1.5, there is a concern that moisture resistance reliability may decrease.

When the side margin portion is separately attached thereto while the thicknesses of the upper and lower cover portions are the same as in the prior art, as a chip size is reduced, and it may be more likely that moisture resistance reliability will decrease. In particular, when the chip size is 0603 or less (a length of 0.6 mm, a width of 0.3 mm), there is a concern that moisture resistance reliability may decrease.

According to the present disclosure, as the thickness C of the lower cover portion may be made to be thicker than the thickness D of the upper cover portion, and a correlation between the width A of the side margin portion and the thickness T of the body is controlled, even when the chip size is 0603 or less (a length of 0.6 mm and a width of 0.3 mm), it is possible to suppress a decrease in moisture resistance reliability.

Therefore, when the length of the body 110 in the second direction is 0.65 mm or less, and the sum of the lengths of the body 110 and the first and second side portions 141 and 142 in the third direction is 0.35 mm or less, significantly small, an effect of improving moisture resistance reliability according to the present disclosure may be remarkably improved.

In addition, the thickness td of the dielectric layer 111 is not particularly limited.

However, when the thicknesses of the upper and lower cover parts are the same as in the prior art, a side margin portion is separately attached thereto, and a dielectric layer is formed to be thin to a thickness of less than 0.6 μm, and in particular, when the thickness of the dielectric layer is 0.45 μm or less, there is a concern that moisture resistance reliability may decrease.

According to the present disclosure, as the thickness C of the lower cover portion is formed to be thicker than the thickness D of the upper cover portion, and a correlation between the thickness C of the lower cover portion, the width A of the side margin portion, and the thickness T of the body is controlled, since moisture resistance reliability can be effectively improved, even when the dielectric layer is very thin, sufficient moisture resistance reliability can be ensured even when the thickness of the dielectric layer is 0.45 μm or less.

Accordingly, when the thickness of the dielectric layer 111 is 0.45 μm or less, an effect of improving moisture resistance reliability according to the present disclosure may be remarkably improved, and miniaturization and high capacitance of the stacked electronic component may be more easily achieved.

The thickness td of the dielectric layer 111 may mean an average thickness of the dielectric layer 111 disposed between the first and second internal electrodes 121 and 122.

The average thickness of the dielectric layer 111 may be measured by scanning an image of a cross-section of the body 110 in the length and thickness direction (a second direction-a first direction) with a Scanning Electron Microscope (SEM).

For example, for an arbitrary dielectric layer extracted from an image scanned with a scanning electron microscope (SEM) of a cross-section of the body 110 in the length and thickness direction (a second direction-a first direction) cut from the central portion in the width direction, an average value can be measured by measuring the thickness at, for example, 30 equally spaced points in the length direction.

The thickness measured at, for example, 30 equally spaced points may be measured by the active portion 112.

In addition, the thickness to of the internal electrodes 121 and 122 need not be particularly limited.

However, when the thickness of the upper and lower cover portions is formed to be the same as in the prior art, and a side margin portion is separately attached and the internal electrodes 121 and 122 are formed to be thin, to have a thickness of less than 0.6 μm, and in particular, when the thickness of the internal electrodes 121 and 122 is 0.45 μm or less, there is a concern that moisture resistance reliability may decrease.

According to the present disclosure, as the thickness C of the lower cover portion is made to be thicker than the thickness D of the upper cover portion, and a correlation between the thickness C of the lower cover portion, the width A of the side margin portion, and the thickness T of the body is controlled, since moisture resistance reliability can be effectively improved even when the internal electrode is very thin, sufficient moisture resistance reliability can be ensured even when the thickness of the internal electrode is 0.45 μm or less.

Accordingly, when the thickness of the internal electrodes 121 and 122 is 0.45 μm or less, an effect of improving moisture resistance reliability according to the present invention may be remarkably improved, and miniaturization and high capacitance of the multilayer electronic component may be more easily achieved.

The thickness to of the internal electrodes 121 and 122 may mean an average thickness of the internal electrodes 121 and 122.

The average thickness of the internal electrodes 121 and 122 can be measured by scanning an image of a cross-section of the body in the length and thickness direction (a second direction-a first direction) with a scanning electron microscope (SEM).

For example, for arbitrary internal electrodes 121 and 122 extracted from an image scanned with a scanning electron microscope (SEM) of a cross-section of the body 110 in the length and thickness direction (second direction-first direction) cut from the central portion in the width direction, an average value can be measured by measuring the thickness at 30 equally spaced points in the length direction.

The thickness measured at 30 equally spaced points may be measured by the active portion 112.

The length of the first and second side margin portions 141 and 142 in the first direction need not be particularly limited. For example, the length of the first and second side margin portions 141 and 142 in the first direction may be 5 μm or more and 15 μm or less, respectively, and more preferably 10 μm or more and 15 μm or less.

When the length of the first and second side margin portions 141 and 142 in the first direction is less than 2 μm, it may be difficult to prevent a short of the internal electrodes 121 and 122 exposed to the side surface, and when the length thereof exceeds 15 μm, an overlapping area of the internal electrodes 121 and 122 may be relatively reduced, such that an effect of securing high capacity due to introduction of the side margin portion may be insignificant.

Referring to FIG. 6, A is a length (a width) of the first side margin portion 141 in the third direction measured from the center of the first side margin portion 141 in the first direction, and A1 is a length (a width) of the first side margin portion 141 in the third direction measured from an extension line of a boundary between the active portion 112 and the upper cover portion 113, and A1/A may be 0.9 or more and 1.0 or less.

According to an embodiment of the present disclosure, since the first or second side margin portions 141/142 are formed by attaching the ceramic green sheet for the side margin portion to the side surface of the body 110, the length (the width) for each position of the first or second side margin portions 141/142 in the third direction may be constant.

That is, in the related art, since the side margin portion was formed by coating or printing a ceramic slurry, deviation of the length (width) for each position of the side margin portion in the third direction was severe.

Specifically, when the side margin portion is formed by applying or printing a ceramic slurry, the length (the width) in the third direction at the center of the side margin portion in the first direction was formed to be thicker than the length (the width) of other regions in the third direction thereof.

For example, the side margin portion is formed by coating or printing ceramic slurry, a ratio of the width of the side margin portion measured at the extension line of the boundary between the active portion and the cover portion to the width at the center of the side margin portion in the first direction is less than 0.9, the deviation thereof may be high.

As described above, in the conventional case in which the width for each position of the side margin portion is large, since a portion occupied by the side margin portion in the same size multilayer electronic component is large, the size of the capacity formation portion cannot be secured, such that it is difficult to secure high capacitance.

On the other hand, compared to the length (the width) in the third direction at the center of the first side margin portion 141 in the first direction, since a ratio of the length (width) of the first side margin portion 141 measured at an extension line of the boundary between the active portion 112 and the upper cover portion 113 is 0.9 or more and 1.0 or less, the length (width) of the first side margin portion 141 in the third direction may be formed to be thin, so that the length (width) of the active portion 112 in the third direction may be secured to be large. In addition, the same ratio may also be applied to the second side margin portion 142.

In an embodiment of the present disclosure, unlike the prior art, since the ceramic green sheet is attached to the side surface of the body, the width of each position of the first or second side margin portion is constant.

Accordingly, it is possible to implement a high-capacitance multilayer electronic component.

Meanwhile, referring to FIG. 6, A is a length (width) of the first side margin portion 141 in the third direction measured from the center of the first side margin portion 141 in the first direction, and A2 is a length (width) of the first side margin portion 141 in the third direction measured from an end of the first side margin portion 141 in the first direction, and A2/A may be 0.9 or more and 1.0 or less. In addition, the same ratio may also be applied to the second side margin portion 142.

Accordingly, the width variation of the side margin portions 141 and 142 is small, so that the large width of the active portion 112 can be secured, and accordingly, a high-capacitance multilayer electronic component can be implemented.

In addition, the first and second side margin portions may include a plurality of dielectric layer stacked in the third direction.

Unlike the conventional method in which the side margin portion is formed by applying or printing ceramic slurry, in the present disclosure, since the side margin portions 141 and 142 may be formed by attaching one or more ceramic green sheets for the side margin portions of the side surface of the body 110, a stacking direction of the dielectric layer of the first and second side margin portions may be a third direction.

External electrodes 131 and 132 may be disposed on the third surface 3 and the fourth surface 4 of the body 110.

As shown in FIG. 4, the external electrodes 131 and 132 may include first and second external electrode 131 and 132 disposed on the third and fourth surfaces 3 and 4 of the body 110, respectively, and connected to the first and second internal electrodes 121 and 122, respectively.

In the present embodiment, it is illustrated that a structure in which the multilayer electronic component 100 has two external electrodes 131 and 132 is described, but the number or shape of the external electrodes 131 and 132 may be changed according to the shape of the internal electrodes 121 and 122 or other purposes.

Further, referring to FIG. 1, the external electrodes 131 and 132 may be disposed to cover a portion of the side margin portions 141 and 142.

Meanwhile, the external electrodes 131 and 132 may be formed of any material as long as they have electrical conductivity such as metal, and a specific material may be determined in consideration of electrical characteristics, structural stability, and the like, and further may have a multilayer structure.

For example, the multilayer structure of the external electrodes 131 and 132 may include an electrode layer disposed on the body 110, a conductive resin layer disposed on the electrode layer, and a plating layer disposed on the conductive resin layer.

However, the present disclosure is not limited thereto, and the external electrode may have a two-layer structure including an electrode layer and a plating layer disposed on the electrode layer.

The electrode layer may be a sintered electrode including a conductive metal and glass. In addition, the electrode layer may be formed by transferring a sheet including a conductive metal onto the body. In addition, first and second electrode layers 131a and 132a may also be formed using an atomic layer deposition (ALD) method, a molecular layer deposition (MLD) method, a chemical vapor deposition (CVD) method, a sputtering method, or the like.

The conductive metal used for the electrode layer is not particularly limited as long as it is a material that can be electrically connected to the internal electrode to form capacitance, and may include one or more selected from a group consisting of, for example, nickel (Ni), copper (Cu), palladium (Pd), silver Ag), gold (Au), platinum (Pt), tin (Sn), tungsten (W), titanium (Ti), and alloys thereof.

The conductive resin layer may be a resin-based electrode including conductive metal and a resin.

The conductive metal used in the conductive resin layer is not particularly limited, as long as it is a material that can be electrically connected to the internal electrode to form capacitance, and may include one or more selected from a group consisting of nickel (Ni), copper (Cu), palladium (Pd), silver (Ag), gold (Au), platinum (Pt), tin (Sn), tungsten (W), titanium (Ti), and alloys thereof.

For a more specific example of the plating layer, the plating layer may be a Ni plating layer or a Sn plating layer, and the plating layer may be a plating layer in which a Ni plating layer and a Sn plating layer are sequentially formed on the electrode layer, and may be a plating layer in which a Sn plating layer, a Ni plating layer, and a Sn plating layer are sequentially formed. In addition, the plating layer may include a plurality of Ni plating layers and/or a plurality of Sn plating layers.

FIGS. 7A to 7F are cross-sectional diagrams and perspective diagrams schematically illustrating a method of manufacturing a multilayer electronic component according to an embodiment of the present disclosure.

Hereinafter, a method of manufacturing a multilayer electronic component according to another embodiment of the present disclosure will be described in detail with reference to FIGS. 7A to 7F.

Figure 7A:
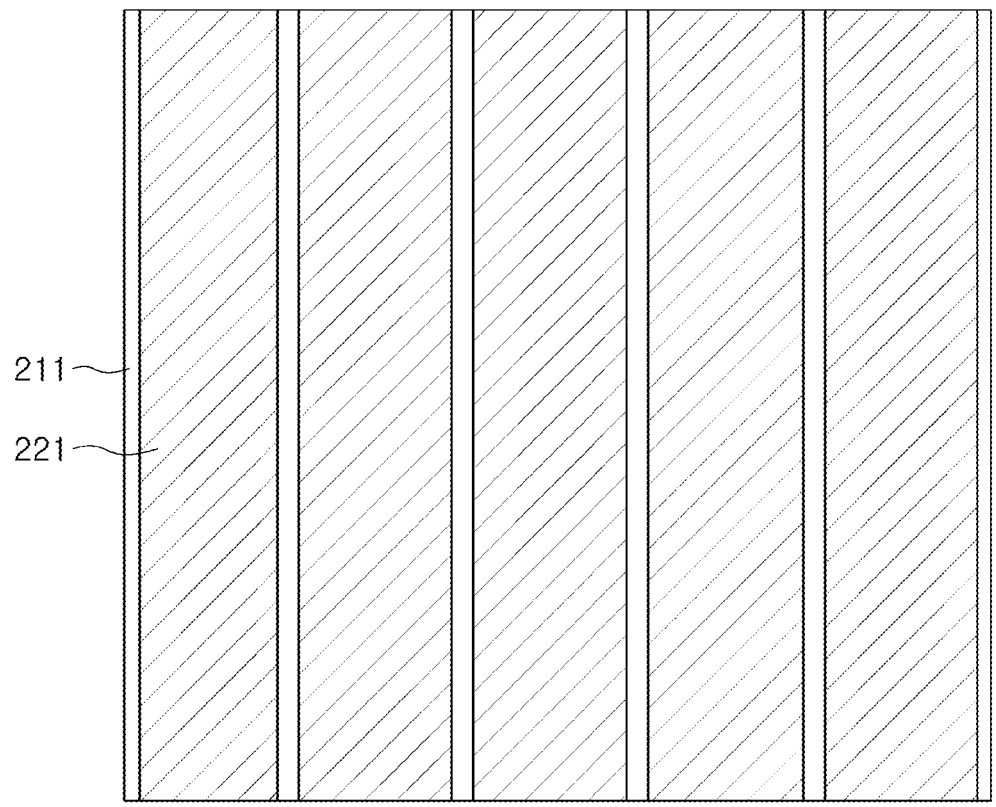
FIGS. 7A to 7F are cross-sectional diagrams and perspective diagrams schematically illustrating a method of manufacturing a multilayer electronic component according to an embodiment of the present disclosure.

As shown in FIG. 7A, a plurality of stripe-type first internal electrode patterns 221 may be formed on the ceramic green sheet 211 at a predetermined distance therebetween. The plurality of stripe-type first internal electrode patterns 221 may be formed to be parallel to each other.

The ceramic green sheet 211 may be formed of a ceramic paste including ceramic powder, an organic solvent, and an organic binder.

The ceramic powder is a material having a high dielectric constant, but is not limited thereto, but as the ceramic powder, a barium titanate ($BaTiO_3$)-based material, a lead composite perovskite-based material, a strontium titanate ($SrTiO_3$)-based material, or the like, may be used, and preferably barium titanate ($BaTiO_3$) powder can be used. When the ceramic green sheet 211 is fired, it becomes a dielectric layer 111 constituting the body 110.

The stripe-type first internal electrode pattern 221 may be formed by an internal electrode paste containing conductive metal. The conductive metal is not limited thereto, but may be one or more of nickel (Ni), copper (Cu), palladium (Pd), silver (Ag), gold (Au), platinum (Pt), tin (Sn), tungsten (W), and alloys thereof.

A method of forming the stripe-type first internal electrode pattern 221 on the ceramic green sheet 211 is not particularly limited, but may be formed by, for example, a printing method such as a screen-printing method or a gravure printing method.

Further, although not shown, a plurality of stripe-type second internal electrode patterns 222 may be formed on another ceramic green sheet 211 at a predetermined distance therebetween.

Hereinafter, the ceramic green sheet on which the first internal electrode pattern 221 is formed may be referred to as a first ceramic green sheet, and the ceramic green sheet on which the second internal electrode pattern 222 is formed may be referred to as a second ceramic green sheet. In addition, a ceramic green sheet on which an internal electrode pattern is not formed may be referred to as a ceramic green sheet for a cover portion.

Figure 7B:
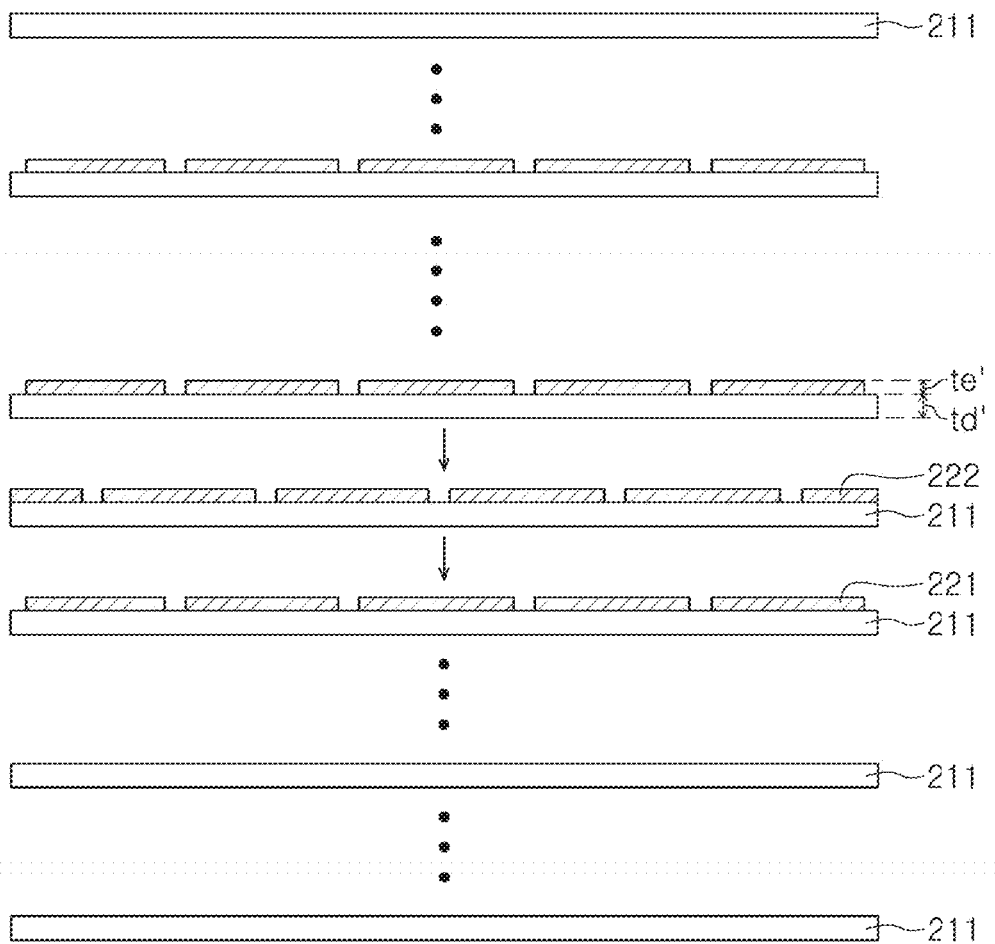

Next, as shown in FIG. 7B, the first and second ceramic green sheets may be alternately stacked so that the stripe-type first internal electrode pattern 221 and the stripe-type second internal electrode pattern 222 are alternately stacked. In addition, ceramic green sheets for a cover portion may be stacked above and below a portion in which the first and second ceramic green sheets are stacked. In this case, a thickness ratio of the upper cover portion and the lower cover portion may be controlled by stacking more ceramic green sheets for the cover portion In this case, the thickness ratio of the upper cover part and the lower cover part can be controlled by stacking more ceramic green sheets for the cover part below than above.

Thereafter, the stripe-type first internal electrode pattern 221 may become a first internal electrode 121, and the stripe-type second internal electrode pattern 222 may be a second internal electrode 122.

In this case, a thickness td' of the first and second ceramic green sheets may be 0.65 μm or less, and a thickness te' of the first and second internal electrode patterns may be 0.55 μm or less.

Accordingly, it is possible to implement a micro-miniaturized and high-capacitance multilayer electronic component having a thin film having a thickness of the dielectric layer td of 0.45 μm or less and a thickness of an internal electrode te of 0.45 μm or less.

Figure 7C:
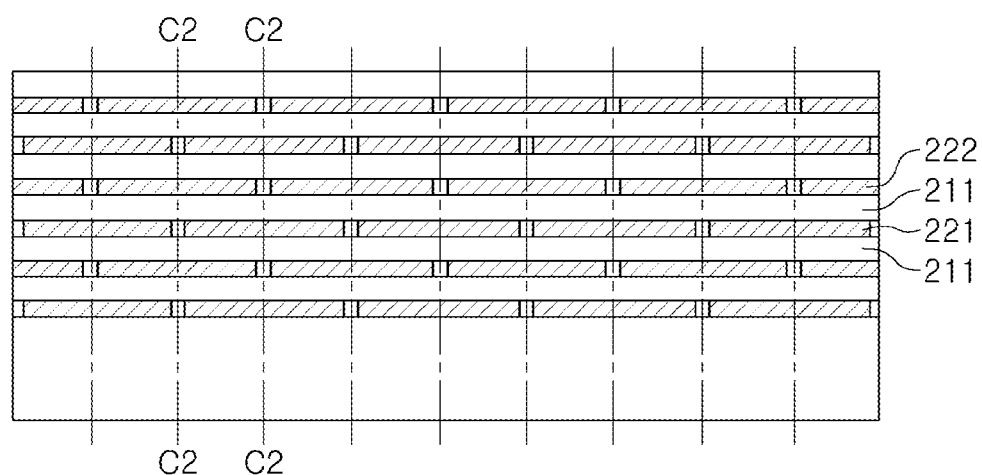
Figure 7D:
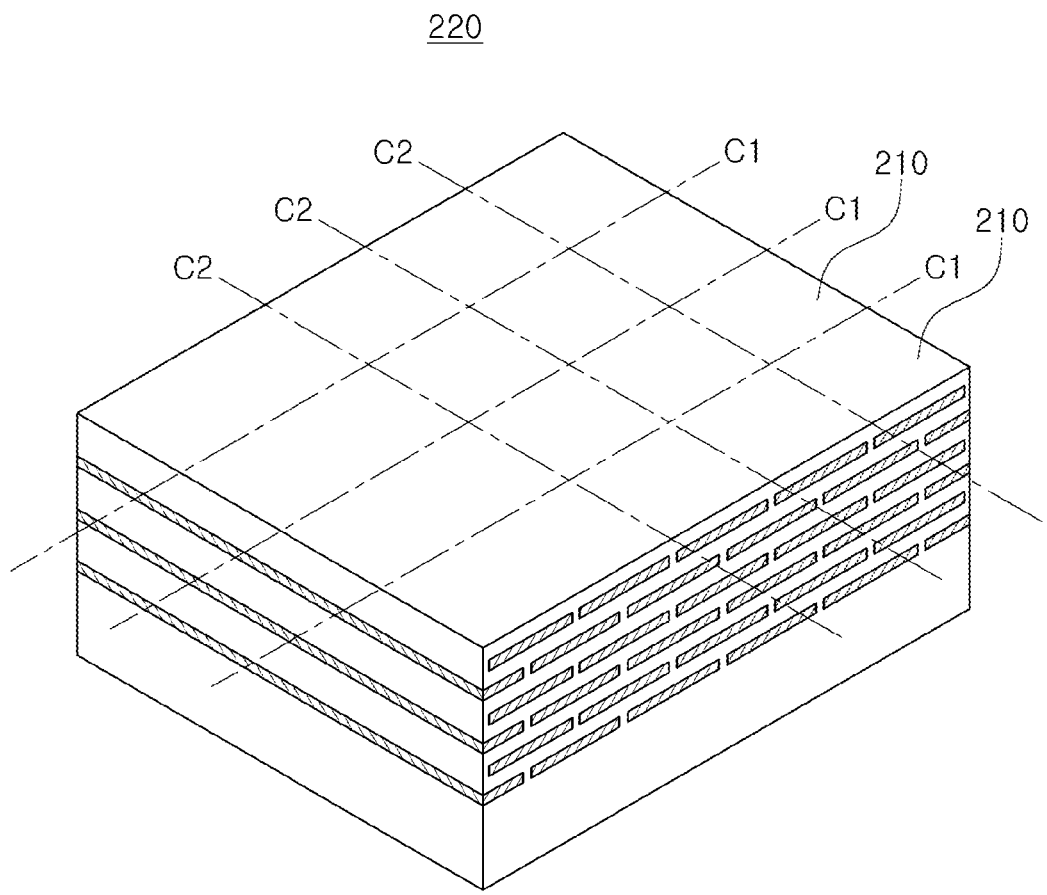

FIG. 7C is a cross-sectional diagram illustrating a ceramic green sheet multilayer body 220 in which a ceramic green sheet for first and second cover portions are stacked, and FIG. 7D is a perspective diagram illustrating a ceramic green sheet multilayer body 220 in which a ceramic green sheet for first and second cover portions are stacked.

Referring to FIGS. 7C and 7D, a first ceramic green sheet on which a plurality of parallel stripe-type first internal electrode patterns 221 are printed and a second ceramic green sheet on which a plurality of parallel stripe-type second internal electrode patterns 222 are printed are alternately stacked with each other.

More specifically, it may be stacked such that a distance between a central portion of the stripe-type first internal electrode pattern 221 printed on the first ceramic green sheet and the stripe-type second inner electrode pattern 222 printed on the second ceramic green sheet overlap.

Next, as shown in FIG. 7D, the ceramic green sheet multilayer body 220 may be cut to cross the plurality of stripe-type first internal electrode patterns 221 and the plurality of stripe-type second internal electrode patterns 222. That is, the ceramic green sheet multilayer body 210 may be a stacked body 210 cut along cutting lines C1 and C2 perpendicular to each other.

More specifically, the stripe-type first internal electrode pattern 221 and the stripe-type second internal electrode pattern 222 may be cut in the length direction and divided into a plurality of internal electrodes having a predetermined width. In this case, the stacked ceramic green sheets may also be cut together with the internal electrode patterns. Accordingly, the dielectric layer may be formed to have the same width as the width of the internal electrode.

In addition, it may also be cut to fit individual body sizes along a C2 cutting line. That is, before forming the first side margin portion and the second side margin portion, a rod-shaped laminate may be cut into individual body sizes along the C2 cutting line to form a plurality of stacked bodies 210.

That is, the rod-shaped laminate may be cut so that a predetermined gap formed between the central portion of the overlapped first internal electrode and the second internal electrode is cut by the same cutting line. Accordingly, one end of the first internal electrode and the second internal electrode may be alternately exposed on the cut surface.

Thereafter, a first side margin portion and a second side margin portion may be formed on the first and second side surfaces of the stacked body 210.

Figure 7E:
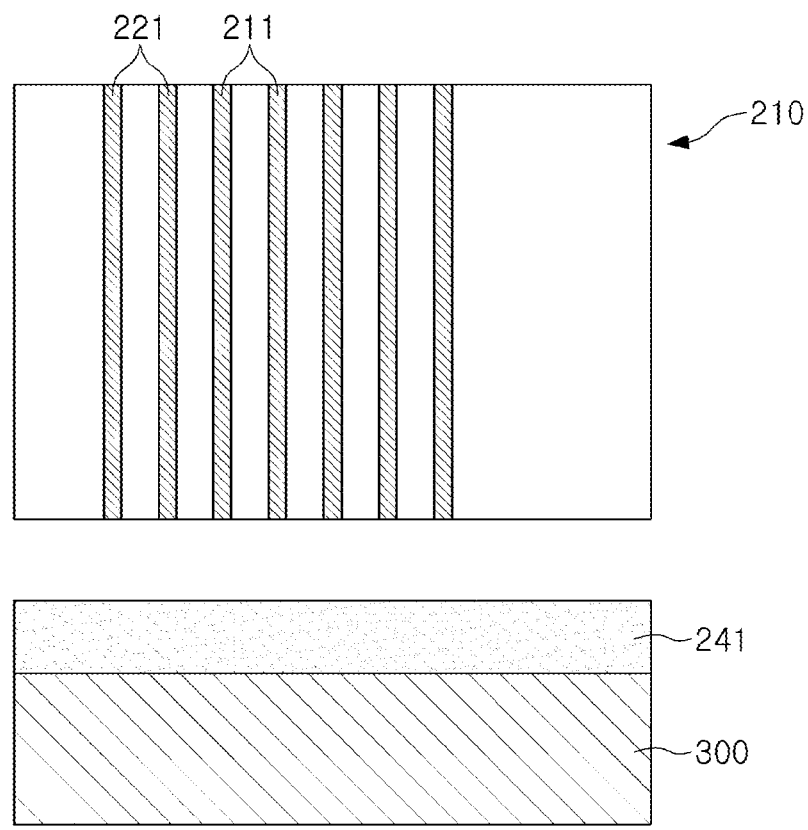

Next, as shown in FIG. 7E, a ceramic green sheet 212 for a side margin portion may be attached to the side surface of the multilayer body 210 in which the ends of the first and second internal electrode patterns are exposed.

A first side margin portion may be formed by attaching a ceramic green sheet 212 for a side margin portion to a first side surface of the stacked body 210, and thereafter, a second side margin portion may be formed by attaching a ceramic green sheet 212 for a side margin portion may be attached to a second side surface of the stacked body 210.

Specifically, in a method of forming the first side margin portion, the ceramic green sheet 212 for the side margin portion is disposed above a punching elastic material 300 made of rubber.

Next, after the multilayer body 210 rotates by 90 degrees so that the first side surface of the multilayer body 210 faces the ceramic green sheet 212 for the side margin portion, the multilayer body 210 is pressed to be in close contact with the ceramic green sheet 212 for the side margin portion.

When the multilayer body 210 is pressed to be in close contact with the ceramic green sheet 212 for the side margin portion to transfer the ceramic green sheet 212 for the side margin portion to the multilayer body 210, due to the punching elastic material 300 made of the rubber material, the ceramic green sheet 212 for the side margin portion may be formed up to the side surface edge portion of the multilayer body 210, and the remaining portion thereof may be cut.

Figure 7F:
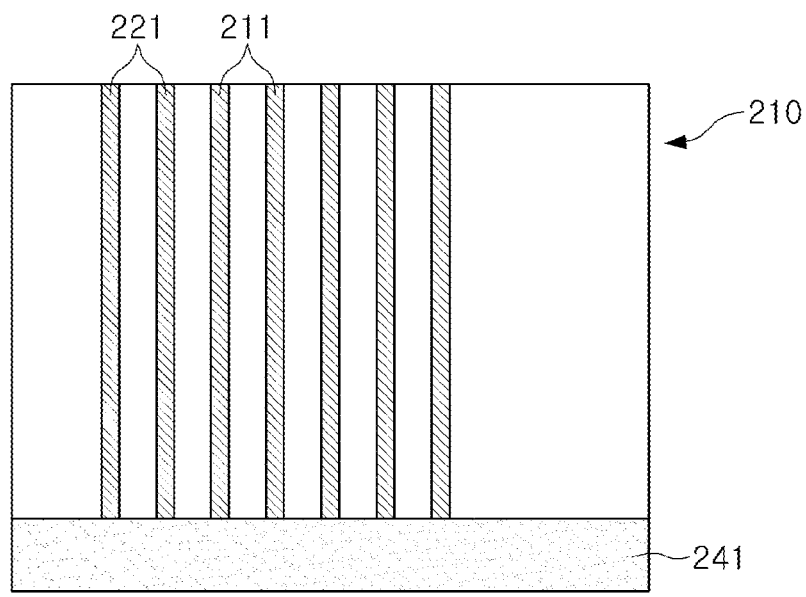

In FIG. 7F, it is shown that the ceramic green sheet 212 for the side margin portion is formed to a side surface edge portion of the multilayer body 210.

Thereafter, the stacked body 210 may be rotated by 180 degrees, and the above-described process may be repeated to form a second side margin portion on a second side surface of the stacked body 210.

Next, a ceramic body including a dielectric layer and first and second internal electrodes may be formed by sintering the multilayer body 210 to which the ceramic green sheet for the side margin portion is attached.

Thereafter, external electrodes may be formed on a third side surface of the ceramic body to which the first internal electrode is exposed and a fourth side surface of the ceramic body to which the second internal electrode is exposed.

According to the above-described manufacturing method, the ceramic green sheet for the side margin portion is thin and has a low thickness variation, such that the size of the active portion may be secured to be large.

Accordingly, it is possible to implement a high-capacitance multilayer electronic component.

Hereinafter, the present disclosure will be described in more detail through Examples, but it should be noted that the scope of the present disclosure is not limited by the Examples, as this is to aid in a specific understanding of the disclosure.

EXAMPLE

Moisture resistance reliabilities in a case in which a portion of the dielectric sheet forms a margin region without separately forming a margin portion (Test No. 1) and in a case in which a margin portion is formed by attaching a ceramic green sheet for a separate margin portion (Test No. 2) were compared and described in Table 1.

However, in Test No. 1, a portion of the dielectric sheet was manufactured to form a margin region without separately forming a margin portion, and a side margin portion was formed by attaching a separate ceramic green sheet for the margin portion, except for Test No. 1.

In addition, sample chips of all test numbers were manufactured so that a length (L) thereof was 0.6 mm and a width (W) thereof was 0.3 mm.

A moisture resistance reliability evaluation was performed for 400 sample chips for each test number.

Each sample chip was subjected to a voltage applied for 2 hours under a condition of 85° C. and 85% relative humidity at 4V for 2 hours to determine a fail. A chip whose insulation resistance value decreases to $\frac{1}{10}$ or less compared to before a voltage is applied was judged as a fail, and the number of sample chips judged as a fail is shown in Table 1 below.

The accelerated lifespan evaluation was evaluated for 400 sample chips for each test number.

Each sample chip was subjected to a voltage applied for 3 hours under a condition of 105° C. and at 6 V to determine a fail. A chip whose insulation resistance value decreases to $\frac{1}{10}$ or less compared to before voltage application was judged as a fail, and the number of sample chips judged as a fail was shown in Table 1 below.

TABLE 1

| Test number | A (μm) | B (μm) | C (μm) | D (μm) | T (μm) | C/A | C/T | Moisture resistance reliability | Accelerated lifespan |
|---|---|---|---|---|---|---|---|---|---|
| 1* | 20 | 315 | 20 | 20 | 355 | 1.00 | 0.056 | 0/400 | 0/400 |
| 2* | 11 | 315 | 20 | 20 | 355 | 1.82 | 0.056 | 36/400 | 24/400 |
| 3* | 11 | 310 | 25 | 20 | 355 | 2.27 | 0.070 | 16/400 | 20/400 |
| 4* | 11 | 307 | 28 | 20 | 355 | 2.55 | 0.079 | 8/400 | 16/400 |
| 5 | 11 | 305 | 30 | 20 | 355 | 2.73 | 0.085 | 0/400 | 0/400 |
| 6 | 11 | 300 | 35 | 20 | 355 | 3.18 | 0.099 | 0/400 | 0/400 |
| 7 | 11 | 355 | 35 | 10 | 400 | 3.18 | 0.088 | 0/400 | 0/400 |
| 8* | 11 | 298 | 37 | 20 | 355 | 3.36 | 0.104 | 0/400 | 0/400 |
| 9* | 11 | 295 | 40 | 20 | 355 | 3.64 | 0.113 | 0/400 | 0/400 |

First, in the case of Test No. 1, since a portion of the dielectric sheet was manufactured to form a margin region without separately forming a margin region, even if the conditions of the present disclosure were not satisfied, moisture resistance reliability and the accelerated lifespan were good. However, in the case of Test No. 1, there is a problem that it is difficult to manufacture A with less than 20 μm.

In the case of Test Nos. 2 to 3, C is less than 30 μm, C/A is less than 2.60, and C/T is less than 0.080, which does not satisfy the conditions presented in the present disclosure, so that it can be seen that moisture resistance reliability and the accelerated lifespan are deteriorated.

In the case of Test Nos. 5 to 7, all the conditions presented in the present disclosure were satisfied, so that moisture resistance reliability and the accelerated lifespan were excellent.

Meanwhile, in the case of Test Nos. 8 and 9, C/A exceeded 3.20 and C/T exceeded 0.100, which resulted in the excellent moisture resistance reliability and the accelerated lifespan, but a problem of decreasing the capacitance per unit volume occurred.

As set forth above, one of the various effects of the present disclosure is to improve moisture resistance reliability, by forming the thickness of the lower cover portion to be thicker than the thickness of the upper cover portion, and controlling a correlation between the thickness of the lower cover portion, the width of the side margin portion, and the thickness of the body.

In addition, one of the various effects of the present disclosure is to improve accelerated lifespan characteristics.

In addition, one of the various effects of the present disclosure is to achieve miniaturization of the multilayer electronic component.

However, various and advantageous advantages and effects of the present disclosure are not limited to the above description, and will be more readily understood in the process of describing specific embodiments of the present disclosure.

While exemplary embodiments have been shown and described above, it will be apparent to those skilled in the art that modifications and variations could be made without departing from the spirit and scope of the present disclosure as defined by the appended claims.

What is claimed is:

1. A multilayer electronic component, comprising:
   a body including a plurality of dielectric layers, and including first and second surfaces opposing in a first direction, third and fourth surfaces connected to the first and second surfaces and opposing in a second direction, and fifth and sixth surfaces connected to the first to fourth surfaces and opposing in a third direction;
   a plurality of internal electrodes disposed inside the body, first ends of the plurality of internal electrodes alternately being exposed to the third or fourth surfaces;
   a first side margin portion disposed on the fifth surface at which the first side margin portion is connected to the plurality of internal electrodes;
   a second side margin portion disposed on the sixth surface at which the second side margin portion is connected to the plurality of internal electrodes; and
   an external electrode disposed on the third and fourth surfaces,
   wherein the body comprises an active portion in which the plurality of dielectric layers and the plurality of internal electrodes are alternately disposed in the first direction to form capacitance, an upper cover portion disposed on a first surface of the active portion in the first direction, and a lower cover portion disposed on a second surface of the active portion in the first direction,
   wherein when a dimension of the first side margin portion in the third direction is A, a dimension of the active portion in the first direction is B, a dimension of the lower cover portion in the first direction is C, a dimension of the upper cover portion in the first direction is D, and a dimension of the body in the first direction is T, D<C is satisfied, C/A is 2.60 or more and C/T is 0.080 or more, and
   wherein A is less than 20 μm.

2. The multilayer electronic component of claim 1, wherein C is 30 μm or more.

3. The multilayer electronic component of claim 1, wherein C/A is in a range from 2.60 to 3.20.

4. The multilayer electronic component of claim 1, wherein C/T is in a range from 0.080 to 0.100.

5. The multilayer electronic component of claim 1, wherein C/D is 1.5 or more.

6. The multilayer electronic component of claim 1, wherein a dimension of the body in the second direction is 0.65 mm or less, and
   a sum of the dimensions of the body and the first and second side margin portions in the third direction is 0.35 mm or less.

7. The multilayer electronic component of claim 1, wherein the plurality of dielectric layers have an average thickness of 0.45 μm or less.

8. The multilayer electronic component of claim 1, wherein the plurality of internal electrodes have an average thickness of 0.45 μm or less.

9. The multilayer electronic component of claim 1, wherein A is a dimension of the first side margin portion in the third direction measured from a center of the first side margin portion in the first direction,
   A1 is a dimension of the first side margin portion in the third direction measured from an extension line of a boundary between the active portion and the upper cover portion,
   wherein A1/A is 0.9 or more and 1.0 or less.

10. The multilayer electronic component of claim 1, wherein A is a dimension of the first side margin portion in the third direction measured from a center of the first side margin portion in the first direction,
    A2 is a dimension of the first side margin portion in the third direction measured from an end of the first side margin portion in the first direction,
    wherein A2/A is 0.9 or more and 1.0 or less.

11. The multilayer electronic component of claim 1, wherein the first and second side margin portions comprise a plurality of dielectric layers stacked in the third direction.

12. A multilayer electronic component, comprising:
    a capacitance forming portion having an upper surface, a lower surface opposing each other in a thickness direction, a pair of end surfaces opposing each other in a length direction and a pair of side surfaces opposing each other in a width direction, the capacitance forming portion having a thickness B;
    a lower cover portion disposed on the lower surface of the capacitance forming portion, the lower cover portion having a thickness C;
    an upper cover portion disposed on the upper surface of the capacitance forming portion, the upper cover portion having a thickness D, D being smaller than C;
    first and second margin portions disposed on corresponding ones of the pair of side surfaces defining a boundary therebetween, the first and second margin portions having a width A, C/A is greater than or equal to 2.60; and
    first and second external electrodes disposed on a corresponding of the pair of end surfaces,
    wherein C/T is greater than or equal to 0.080, wherein T=B+C+D, and
    wherein A is less than 20 μm.

13. The multilayer electronic component of claim 12, wherein the capacitance forming portion comprises a plurality of internal electrodes exposed to the pair of side surfaces, and alternately to a corresponding of the pair of the end surfaces, with dielectric layers interposed therebetween.

14. The multilayer electronic component of claim 12, wherein C/A is in a range from 2.60 to 3.20.

15. The multilayer electronic component of claim 12, wherein C/T is in a range from 0.080 to 0.100.

16. The multilayer electronic component of claim 12, wherein C/D is greater than or equal to 1.5.

* * * * *